(12) United States Patent
McDaid et al.

(10) Patent No.: US 11,755,355 B2
(45) Date of Patent: Sep. 12, 2023

(54) SYSTEMS AND METHODS FOR ASSIGNING DOMAIN IDENTIFIERS TO REMOTE PERIPHERAL DEVICES USING A HYPERVISOR

(71) Applicant: NXP USA, Inc., Austin, TX (US)

(72) Inventors: David McDaid, Glasgow (GB); Daniel McKenna, Glasgow (GB); Steven Bruce McAslan, Glasgow (GB)

(73) Assignee: NXP USA, Inc., Austin, TX (US)

( * ) Notice: Subject to any disclaimer, the term of this patent is extended or adjusted under 35 U.S.C. 154(b) by 126 days.

(21) Appl. No.: 17/104,148

(22) Filed: Nov. 25, 2020

(65) Prior Publication Data

US 2022/0164212 A1 May 26, 2022

(51) Int. Cl.
  *G06F 9/455* (2018.01)
  *G06F 9/50* (2006.01)
  *G06F 9/54* (2006.01)

(52) U.S. Cl.
  CPC ...... *G06F 9/45558* (2013.01); *G06F 9/45545* (2013.01); *G06F 9/5038* (2013.01); *G06F 9/5044* (2013.01); *G06F 9/546* (2013.01); *G06F 2009/4557* (2013.01); *G06F 2009/45579* (2013.01); *G06F 2009/45595* (2013.01)

(58) Field of Classification Search
  CPC ............ G06F 9/45558; G06F 9/45545; G06F 9/5038; G06F 2009/45579; G06F 2009/45595
  See application file for complete search history.

(56) References Cited

U.S. PATENT DOCUMENTS

| | | | |
|---|---|---|---|
| 5,517,626 A | 5/1996 | Archer et al. | |
| 7,620,047 B2 | 11/2009 | Sandy et al. | |
| 2010/0191889 A1* | 7/2010 | Serebrin | G06F 9/4812 718/1 |
| 2018/0075258 A1 | 3/2018 | Circello et al. | |
| 2020/0159940 A1* | 5/2020 | Werner | H04L 9/0894 |
| 2020/0334058 A1* | 10/2020 | Chan | G06F 12/1009 |

FOREIGN PATENT DOCUMENTS

WO    2014055526 A1    4/2014

* cited by examiner

*Primary Examiner* — Dong U Kim

(57) ABSTRACT

A processing system includes an interconnect, a master processing device including processing cores coupled to the interconnect, a hypervisor coupled to the interconnect and configured to allocate the processing cores to one or more virtual machines, domain configuration information including a domain identifier for each of the one or more virtual machines, remote peripheral devices coupled to the interconnect, and a domain access controller coupled to the interconnect and configured to receive the domain identifiers for the remote peripherals directly from the hypervisor through the interconnect.

20 Claims, 2 Drawing Sheets

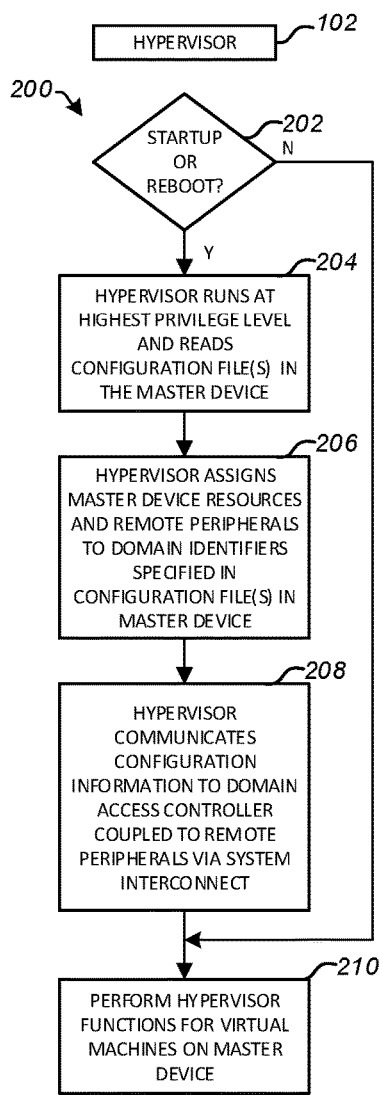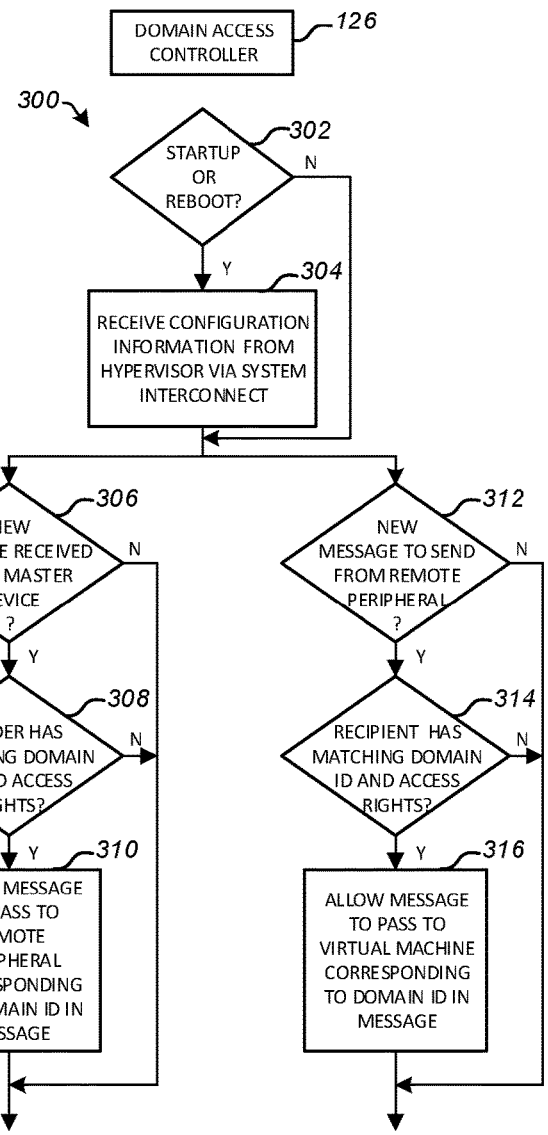
FIG. 2
FIG. 3

SYSTEMS AND METHODS FOR ASSIGNING DOMAIN IDENTIFIERS TO REMOTE PERIPHERAL DEVICES USING A HYPERVISOR

BACKGROUND

Field

The present disclosure relates generally to computer architectures and, more particularly, to virtualization of remote peripheral resources.

Related Art

In a data processing system, various resources, such as bus masters, memory devices, and peripherals, can be grouped into common domains. Each group can be referred to as a resource domain and can include one or more data processors, memory devices, and remote peripheral devices.

Applications are executed by a processor whose execution is controlled by an operating system. The operating system interfaces directly with the hardware components of the processor and the hardware components coupled to the processor. In this configuration, if another operating system, such as another instance of an operating system, is needed, another processor and hardware components would be added to the configuration.

In an attempt to reduce the costs, particularly hardware costs, some systems employ virtualization techniques by sharing the hardware with multiple instances of an operating system, or different operating systems. In one such system, a host operating system runs multiple instances of child operating systems or two or more different operating systems. Virtualization is performed by a host process, referred to as a hypervisor, that allows multiple instances of child operating systems to share a single processor and virtualized hardware resources. The hypervisor enables general freedom of interference: i.e. application X cannot influence application Y, and may also isolate the applications from one another, such that a failure in one application does not cause a failure in the other applications or the hardware platform.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 2 illustrates a flow diagram of functions performed by a hypervisor during startup or reboot to provide domain identifiers to a domain access controller for remote peripheral devices, in accordance with selected embodiments of the invention.

FIG. 3 illustrates a flow diagram of functions performed by a domain access controller, in accordance with selected embodiments of the invention.

DETAILED DESCRIPTION

Figure 1:
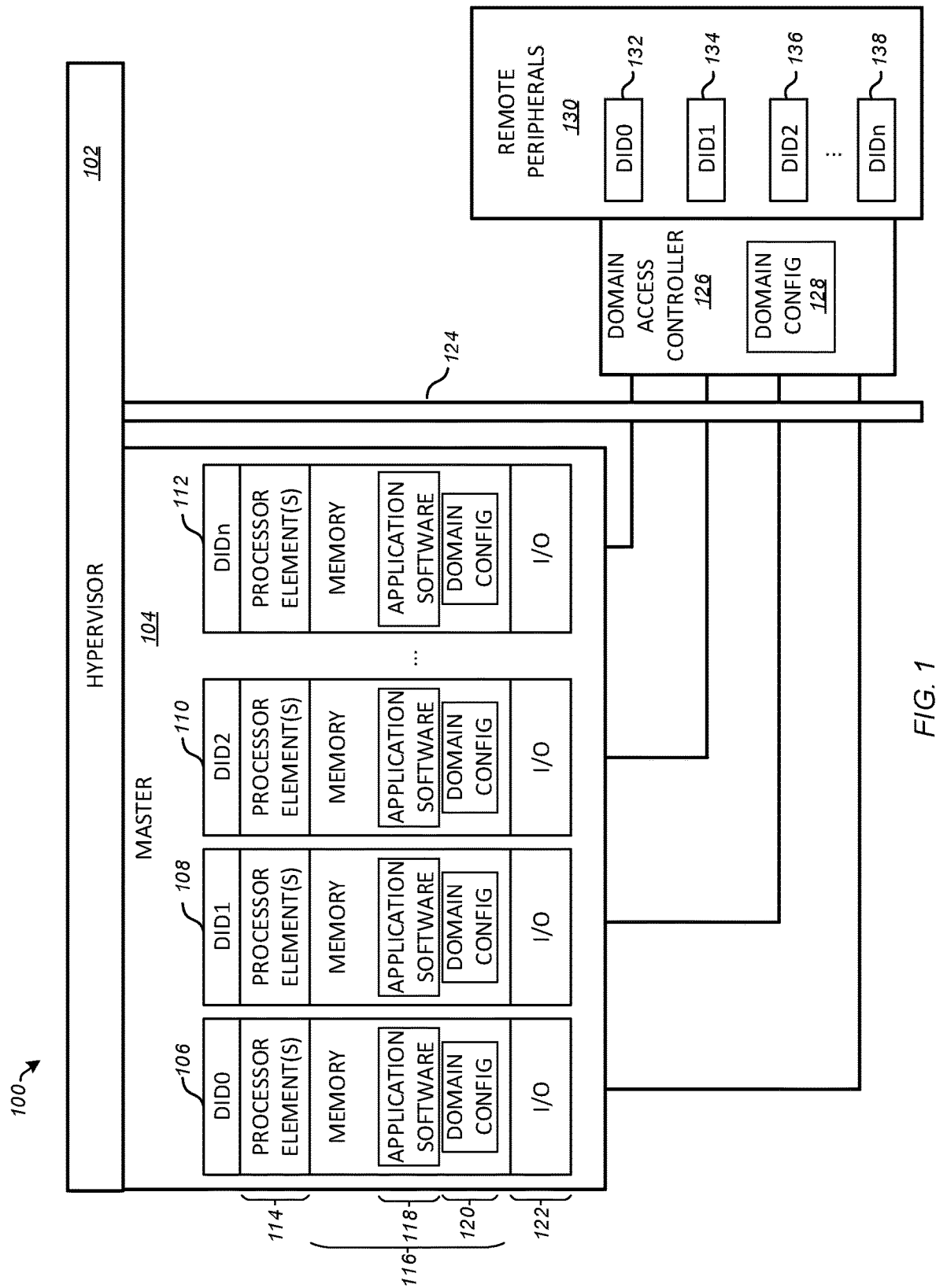
FIG. 1 illustrates a block diagram of a processing system in accordance with selected embodiments of the invention.

In embodiments disclosed herein, a hypervisor extends the partitioning and protection configuration used by a multi-core master device across an interface to include remote peripheral devices. The domain identifiers used by virtual machines in the master device are also provided to a domain access controller for the remote peripherals. The domain access controller interprets the incoming messages and allows access to the corresponding remote peripherals by messages that match the domain identifier and access permissions of the remote peripheral. The hypervisor has the highest privilege of all hardware or software being executed by the master device. During startup or reboot, the hypervisor is activated before any other functions to read domain configuration files that identify the resources, including remote peripheral devices, included in each domain. The domain information is provided to virtual machines in the master device as well as to a domain access controller for the remote peripheral devices. The domain access controller can be implemented as a standalone component coupled between the master device and the remote peripheral components, or as part of the remote peripheral components themselves. The hypervisor communicates directly with the domain access controller through a system interconnect during startup and reboot of the processing system. By assigning the remote peripheral components to a domain as part of the very first functions performed during startup, the likelihood of corrupting the domain configurations decreases, for example, by preventing one domain from accessing resources that are only intended to be allocated to another domain.

FIG. 1 is a block diagram of a processing system 100 in accordance with selected embodiments of the invention that includes hypervisor 102, and master device 104 with two or more virtual machines 106, 108, 110, 112. Each virtual machine 106-112 can include all or at least a portion of processor element 114, memory 116 to store application software 118 and domain configuration information 120, and input/output circuitry 122. Hypervisor 102 can be connected directly or indirectly to interconnect 124 to communicate with domain access controller 126. Remote peripherals 130 are coupled to domain access controller 126. Each peripheral device may be assigned to a domain identifier as a member of a peripheral device subgroup 132-138, according to the domain in virtual machines 106-112 with which remote peripheral devices 130 are associated. Domain assignments for components in virtual machines 106-112 and remote peripheral devices 130 can be stored in memory 116 in one or more files for domain configuration information 120.

Parameters that can be communicated between hypervisor 102 and domain access controller 126 can include domain identifiers, peripheral addresses, and access attributes such as secure/nonsecure and privileged/nonprivileged attributes, among others. Interconnect 124 also routes requests and responses between virtual machines 106-112 and domain access control 126.

Hypervisor 102 can create one or more virtual machines 106-112 in processing system 100. Virtual machines 106-112 are private execution environments run by hypervisor 102 and are referred to as domains, each of which can run a different operating system simultaneously on processing system 100. Hypervisor 102 can be implemented in hardware or in software that runs directly on hardware resources such as processor elements 114, memory 116, and input/output (I/O) interface circuitry 122. One of virtual machines 106-112 may be a control domain that runs a full instance of an operating system and the other domains may run a full instance of an operating system that may be different from the operating system running on the control domain or the other guest domains. Hypervisor 102 partitions, shares, manages, and monitors the hardware resources and acts as an interface between the hardware resources and the domains. As such, hypervisor 102 performs the low-level operations required to provide a virtualized platform. The control domain can perform all other tasks. For example, the control domain can determine which guest domains are created, which resources each guest domain can access, and how much memory is allocated to each guest domain. An example of a commercially available product that can be used for hypervisor 102 is the COQOS Hypervisor by OpenSynergy, Inc. in San Diego, Calif., USA. Other suitable hypervisor products can be used, however.

Hypervisor 102 can include a scheduler that schedules domains onto processor elements 114. Each domain, including the control domain, includes one or more virtual processors that it owns and does not share with other domains. Hypervisor 102 may be integrated with a bootloader or work in conjunction with the bootloader to help create the virtual machines 106-112 during boot. The system firmware (not shown) can start the bootloader using a first processor element. The bootloader can load the domain configuration information 120, kernel images and device trees from a boot partition in memory 116 for virtual machines 106-112. Hypervisor 102 can then communicate domain information to domain access controller 126 before any of the virtual machines 106-112 in master device 102 are configured and begin operation. Using hypervisor 102 to supply domain configuration information 120 directly to domain access controller 126 before processor elements 114 start executing minimizes the opportunity for domains to be corrupted accidentally or intentionally. In addition, once domain access controller 126 receives information such as domain identifiers for each remote peripheral, domain access controller 126 can determine whether the domain identifiers for the sender and receiver match before passing a message along to the receiver. Note that domain access controller 126 can check the domain identifiers for messages being received by remote peripheral devices 130 as well as message being sent by remote peripheral devices 130. The ability to match domain identifiers for messages being sent from remote peripheral devices 130 also helps prevent corruption of virtual machines 106-112. In addition to domain identifiers, domain access controller 126 can also check other domain configuration information 120 such as access rights, to determine whether messages can be passed to and from remote peripheral devices 130.

Once hypervisor 102 shares domain configuration information 120 with domain access controller 126, hypervisor 102 can then switch to a hypervisor mode, initialize hypervisor registers, and hand control over to a guest kernel. On the control core, hypervisor 102 can then do the same for the guest that will run on the control core (i.e., initialize the data structures for the guest, switch to the hypervisor mode, initialize hypervisor registers, and hand off control to the guest kernel). After bootup, the distinction between a primary core and a secondary core may be ignored and hypervisor 102 may treat the two cores equally.

Master device 104 may be implemented using a system on a chip (SoC) that includes multiple processing cores, referred to as a multi-core processor. For example, master device 104 can be implemented using a system-on-a-chip with an ARM architecture or any other architecture. In other embodiments, master device 104 may include a multi-core processor that is not a system-on-a-chip to provide the same or a similar environment. For example, a multi-core processor may be a general computing multi-core processor on a motherboard supporting multiple processing cores. In further embodiments, master device 104 may be implemented using a plurality of networked processing cores. In one embodiment, master device 104 may be implemented using a cloud computing architecture or other distributed computing architecture.

Processor elements 114 are virtualized elements that can each include one or more processing cores to perform calculations and general processing tasks, run application software 118, manage I/O interfaces 122, run operating systems, etc. Note that a single processing core can be shared among virtual machines 106-112, and each virtual machine 106-112 can use more than one processing core.

Domains associated with virtual machines 106-112 can be configured for various purposes. For example, in an automobile, domain 106 may be used for a powertrain controller for remote peripherals that can include an engine, transmission, brakes, battery management system, steering, airbags, and suspension. Domain 108 may be used for a body controller for remote peripherals that can include HVAC, mirrors, interior lighting, doors, sears, steering wheel, sunroof, and windshield wipers. Domain 110 may be used for a cockpit controller for remote peripherals that can include touch displays and voice recognition amplifiers. Domain 112 may be used for a connectivity controller for remote peripherals that can include vehicle-to-everything, broadcast radio, cellular, WiFi, Bluetooth, near field communication, and smart car access components. Other domains and functionality can be implemented in processing system 100 for other purposes, with automotive domains being just one example.

In various embodiments, any number and/or type of domains may be supported (e.g., two domains, three domains, five domains, eight domains, . . . sixteen domains, etc.) in addition to or in place of the four domains enumerated herein. In selected embodiments, two or more different operating system environments are provided (e.g., one for each of the domains). Each of the operating system environments may be dedicated to different cores (or multiple cores) of a multi-core system-on-a-chip (SoC). Any number and/or type of operating environments may be provided, and may be used for devices and equipment other than automobiles.

Memory devices 116 can include one or more random access memory (RAM) devices, such as double data rate (DDR) RAM module, quad serial peripheral interface (QUADSPI) memory, system on-chip RAM modules, graphics on-chip RAM module, boot read only memory (ROM) module, and other suitable memory devices.

Application software 118 can be stored in memory 116 that is internal to an SoC, or in a memory device external to master device 104 and loaded into internal memory devices 116 during startup. Various types of application software 118 can be used, depending on the functions to be provided by processing system 100. Using the automotive example described above, application software 118 can include various controllers for remote peripheral devices 130, such as the powertrain domain controller, body domain controller, cockpit domain controller and connectivity domain controller. Other types of application software 188 can be used in addition to or instead of application software 118 related to automotive domains.

Domain configuration information 120 is used by hypervisor 102 to set up virtual machines 106-112. The information can include, for example, the number of virtual machines 106-112, physical core assignments to each virtual machine 106-112, temporal behavior to limit temporal interferences of multiple virtual machines 106-112 among each other, connections via inter-virtual machine communication channels, access rights of virtual machines 106-112 to remote peripheral devices 130, domain identifiers for components of virtual machines 106-112 and remote peripherals devices 130, and hypervisor security features for master device 104 and domain access control device 126. Other information can be included in domain configuration information 120 in addition to, or instead of, the foregoing information.

Input/output (I/O) circuitry 122 provides a connection between virtual machines 106-112 and remote peripheral devices 130. I/O pins (not shown) are driven by pad drivers that provide for logic level translation, protection against potentially damaging static charges, and amplification of the internal signals to provide sufficient current drive to be useful outside master device 104. I/O circuitry 122 typically includes pads or pins connected to respective input pullup devices, electrostatic discharge protection, input buffers, level shifters, output drivers, and output pulldown devices. Other components can be included in I/O circuitry 122.

I/O circuitry 122 can be coupled to interconnect 124 either directly or through a network interface card (not shown). The connection between I/O circuitry 122, interconnect 124, and domain access control 126 can be wired or wireless. Any suitable interconnect technology can be used. For wired networks, an example of a suitable interconnect technology is Ethernet that allows multiple virtual machines 106-112 to communicate with remote peripheral devices 130 and may be implemented using Ethernet cables plugged into an Ethernet switch, router, hub, network bridge, etc. Messages sent to and from interconnect 122 can adhere to a protocol suitable for the interconnect technology being used. When using Ethernet, for example, a stream of data can be divided into frames or packets, also referred to as messages, that each include source and destination addresses, a payload, and error checking so damaged frames can be discarded and replacements retransmitted.

Domain access controller 126 sends and receives messages to and from master device 104 through interconnect 124. Upon receipt of a message, domain access controller 126 can extract data from the message including a destination address, domain identifier, and access rights. If the domain identifier and access rights match the information in domain configuration information 128 in domain access control 126 for the remote peripheral corresponding to the destination address, the message is routed to the corresponding remote peripheral. Note that the information in domain configuration information 128 may be a subset of the domain configuration information 120 in master device 104. A centralized domain access controller 126 can be implemented for use by all remote peripheral devices 130. Alternatively, some or all of remote peripheral devices 130 may have their own domain access controller to check whether the domain identifier and, optionally, access rights match. If the domain identifier in a message does not match the domain identifier for a particular remote peripheral device 130, the message may be discarded or the message may be flagged and an alert may be sent to hypervisor 102, one of virtual machines 106-112, or to a component external to processing system 100 for security or other purposes.

As remote peripherals 130 receive data from external sources, there is potential for the data to include malicious software or other components from an external device that may try to gain control of master device 104 through information sent from remote peripherals 130 to master device 104. Thus, in addition to checking domain identifiers and, optionally, access rights, of messages sent to remote peripheral devices 130 by master device 104, domain access controller 126 can also check whether there is a match between domain identifiers and, optionally, access rights, of messages sent from remote peripheral devices 130 to master device 104. In this manner, data cannot be sent from one domain in remote peripherals 130 to another domain in master device 104.

One or more remote peripheral devices 130 may send data to or receive data from portable media devices, data storage devices, servers, mobile phones, radios for AM, FM and digital or satellite broadcast, etc. which are connected through connector hardware such as a one or more USB connectors, firewire connectors, lightning connectors, wireless communications connections for data transfer using infrared communication, Bluetooth communication, ZigBee communication, Wi-Fi communication, communication over a local area network and/or wireless local area network, etc.

Some remote peripheral devices 130 may be connected to one or more video connectors for the transmission of video data between devices/sources and processing system 100. For example, a video connector may follow a standard such as High-Definition Multimedia Interface (HDMI), Mobile High-definition Link (MHL), etc. The video connector may implement a standard using auxiliary processors, integrated circuits, memory, a mobile Industry Processor Interface, etc.

For automotive applications, one or more remote peripheral devices 130 may be connected to one or more Local Interconnect Networks (LIN) and/or Controller Area Networks (CAN) to allow communication between vehicle components. Vehicle sensors may be included in remote peripheral devices 130 such as one or more of gyroscopes, accelerometers, three dimensional accelerometers, inclinometers, thermometers, etc. Other remote peripheral devices 130 may be used, in addition to, or instead of, the remote peripherals devices 130 described herein.

Referring to FIGS. 1 and 2, FIG. 2 illustrates a flow diagram 200 of functions performed by hypervisor 102 during startup and reboot to provide domain identifiers and, optionally, other information, to domain access controller 120 for remote peripheral devices 130, in accordance with selected embodiments of the invention. Process 202 can include determining whether master device 104 is in startup or reboot mode. If in startup or reboot mode, process 204 can include running hypervisor 102 directly on one of the processor cores in master device 104 at the highest privilege level to read domain configuration information file(s) 120 in memory 116 of master device 104. Process 204 can be performed before virtual machines 106-112 are configured and operating to avoid any interference or corruption, intentional or unintentional, of the information in domain configuration information file(s) 120. Note that instead of including a separate domain configuration information file 120 for each virtual machine 106-112, master device 104 can have just one, or a number less than n, of centralized domain configuration information file that is used by hypervisor 102 to configure virtual machines 106-112.

In process 206, hypervisor 102 uses the information in domain configuration information file(s) 120 to assign the resources in master device 104 and remote peripherals 130 to domains using domain identifiers. The same domain identifier is typically assigned to several components, depending on the functions to be performed by the virtual machine 106-112 and remote peripheral subgroup 132-138. As shown in FIG. 1, each virtual machine 106-112 includes one or more processor elements 114, memory 118 storing one or more application software programs 118 and domain configuration information files 120, and I/O circuitry 122. Other embodiments of virtual machines 106-112 may have different, and/or a greater or lesser number of components than virtual machines 106-112 shown in FIG. 1.

In process 208, hypervisor 102 provides at least some of the information in domain configuration information file(s) 120 such as domain identifiers and, optionally, access rights for each domain, to domain configuration information file 128 in domain access controller 126 through system interconnect 124. In some embodiments, some or all of remote peripherals 130 can include their own domain access controller instead of using a centralized domain access controller 126. When an individual, independent domain access controller is used for a remote peripheral, the domain configuration information may be stored in memory associated with the corresponding remote peripheral. Note that more than one remote peripheral can be included in a particular domain and therefore two or more remote peripherals can have the same domain identifier, as indicated by remote peripheral subgroups 132-138 labeled as DID0, DID1, DID2, . . . DIDn in FIG. 1. Note that in addition to domain identifiers and access rights, other information from domain configuration information file(s) 120 in master device 104 can be provided to domain configuration information file 128 used by domain access controller 126, as needed.

Once process 208 is completed, or if master device 104 was not in startup or reboot mode, process 210 is performed in which hypervisor 102 performs hypervisor functions for virtual machines 106-112 in master device 104 to support the configuration and controlled interaction and communication between components of master device 104 and virtual machines 106-112.

Referring to FIGS. 1 and 3, FIG. 3 illustrates a flow diagram 300 of functions performed by domain access controller 126, in accordance with selected embodiments of the invention. If process 302 determines that master device 104 is in startup or reboot mode, process 304 can include receiving and storing domain configuration information 126 from hypervisor 102 via system interconnect 124. Once the domain configuration information is received, or if master device 104 is not in startup or reboot mode, control transitions to processes 306 and process 312. In process 306, domain access controller 126 determines whether a new message is received from master device 104. If so, process 308 determines whether the sender of the message has a domain identifier that matches the domain identifier of the remote peripheral to which the message is being sent. The sender is typically one of virtual machines 106-112. Each of remote peripheral subgroups 132-138 corresponds to and is used with one of virtual machines 106-112, and therefore is assigned to the same domain identifier as the corresponding virtual machine 106-112. Process 308 can also include determining whether, in addition to a matching domain identifier, the sending virtual machine 106-112 has the appropriate access rights to send the message to the remote peripheral. If the domain identifiers for the sender matches the domain identifier for the remote peripheral, then domain access controller 126 allows the message to pass to the remote peripheral corresponding to the domain identifier in the message in process 310.

In process 312, domain access controller 126 can determine that one of the remote peripherals 130 is sending a message to one of virtual machines 106-112. In this situation, domain access controller 126 can determine whether the sender of the message has the same domain identifier, and optionally the appropriate access rights, as the virtual machine 106-112 receiving the message in process 314. When the domain identifiers for the sender and receiver match, and optionally sending remote peripheral 130 has the appropriate access rights, domain access controller 126 allows the message to pass to the corresponding one of virtual machines 106-112 with the matching identifier.

By now it should be appreciated that processing system 100 can help prevent corrupted messages from being sent between virtual machines 106-112 and remote peripherals 130. Using hypervisor 102 to communicate domain configuration information 120 from master device 104 to domain access controller 126 during startup or reboot, and before virtual machines 106-112 are configured and running, minimizes the chances of domain identifiers and other information provided to domain access controller 126 to validate messages from being tampered with, whether intentionally or unintentionally.

In some embodiments, a processing system can comprise an interconnect (124), a master processing device (104) including processing cores coupled to the interconnect, a hypervisor (102) coupled to the interconnect and configured to allocate the processing cores to one or more virtual machines (106-112), domain configuration information (120) including a domain identifier for each of the one or more virtual machines, remote peripheral devices coupled to the interconnect, and a domain access controller coupled to the interconnect and configured to receive the domain identifiers for the remote peripherals directly from the hypervisor through the interconnect.

In some aspects, the domain access controller can be further configured to determine whether at least one of: a domain identifier in a message from one of the virtual machines matches the domain identifier of the remote peripheral to which the message is addressed, and access rights of one of the virtual machines that sent a message to one of the remote peripherals matches access rights of the remote peripheral.

In other aspects, the domain access controller can be further configured to determine whether at least one of: a domain identifier in a message from one of the remote peripherals matches the domain identifier of the virtual machine to which the message is addressed, and access rights of one of the remote peripherals that sent a message to one of the virtual machines match access rights of the one of the virtual machines.

In further aspects, the domain access controller can receive messages from the virtual machines and pass the messages to the corresponding remote peripherals when the domain identifiers in the messages match the domain identifiers of the remote peripherals to which the messages are addressed.

In still further aspects, each of the remote peripherals includes the domain access controller.

In still further aspects, a domain associated with the domain identifier for each of the virtual machines can include one or more of the remote peripheral devices.

In still further aspects, the master processing device can further include memory for storing application program codes and the domain configuration information.

In still further aspects, at least two of the processing cores can use different operating systems.

In still further aspects, the virtual machines can communicate with the domain access controller through the interconnect.

In still further aspects, the remote peripherals can be external to the master processing device, and the domain access controller can receive messages from the remote peripherals and pass the messages to the corresponding virtual machines when the domain identifiers in the messages match the domain identifiers of the virtual machines to which the messages are addressed.

In other selected embodiments, a method of controlling master device access to remote peripherals can comprise, during startup and reboot of a multicore processing system: running a hypervisor at a highest priority in the master device, accessing, by the hypervisor, domain information in a configuration file in the master device, the domain information including domain identifiers for virtual machines in the master device and remote peripherals external to the master device, and providing, by the hypervisor, the domain identifiers to a domain access controller. The domain access controller can be coupled to an interconnect between the hypervisor and the remote peripherals.

In other aspects, the domain access controller can be external to the master device.

In still further aspects, the method can further comprise, in the domain access controller, checking domain identifiers in messages from the virtual machines to determine whether the domain identifiers match the domain identifiers for the remote peripherals to receive the messages.

In still further aspects, the method can further comprise, in the domain access controller, allowing messages to pass to the remote peripherals when the domain identifiers match the domain identifiers for the remote peripherals.

In still further aspects, the method can further comprise, in the domain access controller, allowing messages to pass to the remote peripherals when access rights of the virtual machines match access rights of the remote peripherals.

In further selected embodiments, a processing system can comprise a master device including a processor configured to run a hypervisor at a highest priority in the master device, an interconnect connected to the hypervisor in the master device, a domain access controller connected to the interconnect, and remote peripherals connected to the domain access controller. During startup and reboot of the processing system, the hypervisor can be configured to access domain information in the master device, the domain information including domain identifiers for virtual machines in the master device and for the remote peripherals, and to provide the domain identifiers to the domain access controller, wherein the domain access controller is coupled to the interconnect between the hypervisor and the remote peripherals.

In other aspects, the domain access controller and the remote peripherals can be external to the master device.

In further aspects, the domain access controller can be configured to determine whether domain identifiers in messages from the virtual machines match the domain identifiers for the remote peripherals to receive the messages.

In still further aspects, the domain access controller can be configured to allow the messages to pass to the remote peripherals when the domain identifiers match the domain identifiers for the remote peripherals.

In still further aspects, the domain access controller can be configured to allow messages to pass to the remote peripherals when access rights of the virtual machines match access rights of the remote peripherals.

The term "software," "application," or "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements. Those skilled in the art will also recognize the specific use of the domain identifier as used herein can be replaced with any other processor-controlled programmable identifier.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Embodiments of the invention may be implemented in hardware, software, firmware, or a combination thereof. When implemented in software, the hardware executing the software will use various electrical circuitry to perform the functions specified by the software. Therefore, use the term "circuit" can include electrical circuits in hardware that perform the functionally without the use of software, as well as circuitry in computer hardware executing software to perform the specified functionality.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processing system comprising:
an interconnect;
a master processing device including processing cores coupled to the interconnect;
a hypervisor coupled to the interconnect and configured to allocate the processing cores to one or more virtual machines;
domain configuration information including a domain identifier for each of the one or more virtual machines;
remote peripheral devices coupled to the interconnect; and
a domain access controller coupled to the interconnect and configured to receive the domain identifiers for the remote peripherals directly from the hypervisor through the interconnect, wherein the hypervisor is configured to, upon startup or bootup of the processing system, communicate the domain identifiers to the domain access controller via the interconnect before any of the one or more virtual machines are configured and begin operation.

2. The processing system of claim 1, wherein the domain access controller is further configured to determine whether at least one of: a domain identifier in a message from one of the virtual machines matches the domain identifier of the remote peripheral to which the message is addressed, and access rights of one of the virtual machines that sent a message to one of the remote peripherals matches access rights of the remote peripheral.

3. The processing system of claim 1, wherein the domain access controller is further configured to determine whether at least one of: a domain identifier in a message from one of the remote peripherals matches the domain identifier of the virtual machine to which the message is addressed, and access rights of one of the remote peripherals that sent a message to one of the virtual machines match access rights of the one of the virtual machines.

4. The processing system of claim 1, wherein the domain access controller receives messages from the virtual machines and passes the messages to the corresponding remote peripherals when the domain identifiers in the messages match the domain identifiers of the remote peripherals to which the messages are addressed.

5. The processing system of claim 4, wherein each of the remote peripherals includes the domain access controller.

6. The processing system of claim 1, wherein a domain associated with the domain identifier for each of the virtual machines includes one or more of the remote peripheral devices.

7. The processing system of claim 1, wherein the master processing device further includes memory for storing application program codes and the domain configuration information.

8. The processing system of claim 1, wherein at least two of the processing cores use different operating systems.

9. The processing system of claim 1, wherein the virtual machines communicate with the domain access controller through the interconnect.

10. The processing system of claim 1, wherein the remote peripherals are external to the master processing device, and the domain access controller receives messages from the remote peripherals and passes the messages to the corresponding virtual machines when the domain identifiers in the messages match the domain identifiers of the virtual machines to which the messages are addressed.

11. A method of controlling access by a master device to remote peripherals comprising:
during startup and bootup of a multicore processing system:
running a hypervisor at a highest priority in the master device;
accessing, by the hypervisor, domain information in a configuration file in the master device, the domain information including domain identifiers for virtual machines in the master device and remote peripherals external to the master device; and
providing, by the hypervisor, the domain identifiers to a domain access controller, wherein the domain access controller is coupled to an interconnect between the hypervisor and the remote peripherals.

12. The method of claim 11, wherein the domain access controller is external to the master device.

13. The method of claim 11, further comprising:
in the domain access controller, checking domain identifiers in messages from the virtual machines to determine whether the domain identifiers match the domain identifiers for the remote peripherals to receive the messages.

14. The method of claim 13, further comprising:
in the domain access controller, allowing messages to pass to the remote peripherals when the domain identifiers match the domain identifiers for the remote peripherals.

15. The method of claim 13, further comprising:
in the domain access controller, allowing messages to pass to the remote peripherals when access rights of the virtual machines match access rights of the remote peripherals.

16. A processing system comprising:
a master device including a processor configured to run a hypervisor at a highest priority in the master device;
an interconnect connected to the hypervisor in the master device;
a domain access controller connected to the interconnect;
remote peripherals connected to the domain access controller; and
wherein during startup and bootup of the processing system, the hypervisor is configured to access domain information in the master device, the domain information including domain identifiers for virtual machines in the master device and for the remote peripherals, and to provide the domain identifiers to the domain access controller, wherein the domain access controller is coupled to the interconnect between the hypervisor and the remote peripherals.

17. The processing system of claim 16, wherein the domain access controller and the remote peripherals are external to the master device.

18. The processing system of claim 16, wherein:
the domain access controller is configured to determine whether domain identifiers in messages from the virtual machines match the domain identifiers for the remote peripherals to receive the messages.

19. The processing system of claim 18, wherein:
the domain access controller is configured to allow the messages to pass to the remote peripherals when the domain identifiers match the domain identifiers for the remote peripherals.

20. The processing system of claim 13, wherein:
the domain access controller is configured to allow messages to pass to the remote peripherals when access rights of the virtual machines match access rights of the remote peripherals.

\* \* \* \* \*